United States Patent Office 2,702,966
Patented Mar. 1, 1955

2,702,966

PROCESS FOR THE IMPROVEMENT OF SOILS

Thomas Boyd, Springfield, Mass., assignor to Monsanto Chemical Company, St. Louis, Mo., a corporation of Delaware No Drawing. Application March 24, 1952,
Serial No. 278,313

6 Claims. (Cl. 47—58)

This invention relates to a process for the improvement of soils. More particularly, the invention relates to a process for the conditioning of soils by incorporating therein certain polymeric materials.

The structural characteristics of different kinds of soil vary widely. When cultivated continuously, various soils react differently. One common factor is that the soils become denser and less granulated. When soil has depleted or exhausted its organic matter, it has lost its ability to drain and breathe and therefore, becomes subject to puddling, washouts, gullies and other forms of erosion. Because of lack of pore space between separate aggregates, its moisture absorbing and holding capacity is low and cracks or fissures develop which hasten water loss.

One object of this invention is to provide a process for the improvement of soil.

A further object of this invention is to provide a process for restoring to soil its ability to drain and breathe.

According to one embodiment of this invention, these and other objects may be attained by the incorporation of a substantially water-insoluble polymer of acrylonitrile into the soil. The polymer, in finely-divided form, is spread on the surface of the ground and then worked into it by harrowing, rotary tilling, raking or other conventional methods.

The soil improving properties of the polymers develop very slowly in the soil and the full benefit thereof is not attained for from six months to a year after the incorporation of the polymer. For farming use, the slowness of the soil conditioning process may be advantageous since it insures a longer lasting improvement.

Another embodiment of this invention is designed to produce more rapid attainment of the desired results and is especially useful in erosion control, and immediate improvement of poor farm land. This embodiment comprises incorporating into the soil an alkaline earth metal compound prior to the addition of the polymer.

The following examples are given in illustration and are not intended as limitations on the scope of this invention. Where parts are mentioned, they are parts by weight.

Example I

A soil which drains poorly and shows a tendency to bake hard under a hot sun is loosened up by harrowing, rotary tilling, or other conventional means to a depth of about six inches. Spread over the surface of the soil so prepared, pulverulent calcium oxide to the extent of about 0.2 pound per 100 square feet of surface area and work the calcium oxide into the top three inches of soil. Then spread onto the soil surface a pulverulent water-insoluble polymer of acrylonitrile to the extent of about 0.4 pound per 100 square feet of soil and work this material into the soil to a depth of about three inches. Now wet down the prepared soil thoroughly with water. At first, it will appear that the soil densifies under the influence of the water but after a short time the dense soil breaks up into loose granular aggregates. Until the aggregates are formed the soil appears to be very wet and muddy but as the aggregates form, the evidence of surplus water disappears. On analysis, it will be found that the water has not drained off due to the porosity of the soil but has been bound up in the aggregates. A portion of the same soil treated in the same manner, except for the polymer addition, does not break up into granular aggregates and retains the appearance of excess moisture until such moisture has had time to evaporate.

If the example is repeated, using a copolymer of styrene and acrylonitrile containing 50 mol percent of acrylonitrile, substantially the same results are obtained. However, with this copolymer substantially more should be added to the soil and the development of aggregates is somewhat slower.

Example II

Cultivate a soil containing substantial amounts of hard clay to a depth of about six inches. Spread on the soil a mixture of about 0.3 pound of calcium oxide and 0.003 pound of potassium carbonate per 100 square feet of surface area. Work this material into the top three inches of the soil. Now spread about 0.67 pound of a water-insoluble polymer of acrylonitrile over each 100 square feet of surface area and work it into the top three inches of the soil. Wet down the soil thus prepared until it will apparently absorb no more water. Very shortly thereafter the soil will crumble into loose granular aggregates and all outward appearances of excess moisture will disappear.

Repeat Examples I and II except spread the polymer on top of the lime, or lime and carbonate, and work the spread material into the soil at the same time. Similar results are obtained.

It is essential for the operation of this invention that an alkaline earth metal compound and particularly a calcium compound is worked into the ground or spread on the surface thereof prior to the addition of the polymer to the soil. The amount of alkaline earth metal compound used on a weight basis should be about one-half the weight of the acrylonitrile in the polymer. However, if the soil is so acid in the first place as to need lime or other alkali to sweeten it for farming purposes, an excess of calcium compound may be used. Calcium oxide, calcium hydroxide and calcium carbonate are the preferred treating agents but they may be replaced in whole or in part by the oxides, hydroxides and carbonates of other alkaline earth metals including magnesium, barium and strontium.

In a further embodiment of this invention described in Example II, the soil conditioning is speeded still further by the use of an alkaline reacting non-phytotoxic alkali metal salt of a weak acid. Salts of lithium, sodium, potassium, rubidium and cesium which are alkaline when dissolved in water, are operative. Preferred among these salts are potassium carbonate and potassium metaphosphate. The alkali metal compounds may replace up to 50% of the alkaline earth metal compounds but generally will be used in amounts of from 0.1% to 10% of the alkaline earth metal compound.

The polymers which are operative in this invention are substantially water-insoluble polymers of acrylonitrile and alpha-substituted acrylonitriles and copolymers thereof with one or more vinylidene compounds in which copolymers the acrylonitrile constitutes at least 25 mol percent. The molecular weight of the polymers should be at least 5000 as calculated by the Staudinger equation. For most efficient operation, the polymers should be in a finely-divided state. Since most of such polymers are hard brittle materials they may be easily pulverized to the desired fineness in standard equipment.

The amount of polymer used may vary from 0.1 to about 2 pounds or more per 100 square feet of soil to be treated. Except for highly deteriorated soils or soils especially high in clay content, the amount of polymer used should be about 0.5 pound per 100 square feet of soil to be treated. As shown in the examples, the alkaline earth metal compound may be worked into the soil first or in conjunction with the polymer.

The incorporation of the alkaline earth metal compound and the polymer into the soil should be followed by a thorough wetting of the soil. In areas where rainfall is abundant, this may sometimes be left to the normal course of the weather, but it is preferred to add the water soon after the soil is treated to obtain the beneficial results more quickly and more surely.

It is obvious that variations may be made in the prod-

What is claimed is:

1. A process for the improvement of soil containing a compound taken from the group consisting of the oxides, hydroxides and carbonates of alkaline earth metals, which process comprises incorporating a substantially water-insoluble pulverulent polymer of acrylonitrile into the soil and thereafter wetting down the treated soil with water.

2. A process for the improvement of soil which comprises incorporating a pulverulent compound taken from the group consisting of the oxides, hydroxides and carbonates of alkaline earth metals into the soil, followed by the incorporation therein of a substantially water-insoluble pulverulent polymer of an acrylonitrile and then wetting down the treated soil with water.

3. A process as in claim 2 wherein the polymer is a homopolymer of acrylonitrile.

4. A process as in claim 2 wherein the alkaline earth metal compound is calcium oxide.

5. A process for the improvement of soil which comprises incorporating therein a pulverulent compound taken from the group consisting of the oxides, hydroxides and carbonates of the alkaline earth metals and a pulverulent compound taken from the group consisting of the alkaline reacting non-phytotoxic alkali metal salts of weak acids, then incorporating into the soil a pulverulent substantially water-insoluble polymer of an acrylonitrile and finally wetting down the soil with water.

6. A process as in claim 5 wherein the polymer is a homopolymer of acrylonitrile, the alkaline earth metal compound is calcium oxide and the alkali metal compound is calcium carbonate.

References Cited in the file of this patent

UNITED STATES PATENTS

| | | |
|---|---|---|
| 1,984,417 | Mark | Dec. 18, 1934 |
| 2,459,874 | Fay | Jan. 25, 1949 |
| 2,582,194 | Dudley | Jan. 8, 1952 |
| 2,661,344 | Slocombe | Dec. 1, 1953 |

FOREIGN PATENTS

| | | |
|---|---|---|
| 501,726 | Belgium | Mar. 7, 1951 |

OTHER REFERENCES

The New Garden Encyclopedia, published 1941 by Wise & Co., New York. Pp. 1018 and 1208, articles "Quicklime" and "Sweet Pea."